United States Patent [19]

Wamprecht et al.

[11] Patent Number: 5,728,789
[45] Date of Patent: Mar. 17, 1998

[54] POWDER COATING COMPOSITIONS CONTAINING COPOLYMERS HAVING HYDROXYL AND CARBOXYLIC ACID ANHYDRIDE GROUPS AS BINDERS

[75] Inventors: Christian Wamprecht, Neuss; Hans-Joachim Kreuder, Tönisvorst; Armin Zenner, Dormagen; Henning Klussmann, Rommerskirchenm, all of Germany

[73] Assignee: Bayer Aktiengesellschaft, Leverkusen, Germany

[21] Appl. No.: 855,347

[22] Filed: May 13, 1997

Related U.S. Application Data

[63] Continuation of Ser. No. 706,365, Aug. 30, 1996, abandoned, which is a continuation of Ser. No. 727,766, Jul. 10, 1991, abandoned.

[30] Foreign Application Priority Data

Jul. 18, 1990 [DE] Germany ............ 40 22 750.2

[51] Int. Cl.$^6$ ............ C08F 222/04; C08F 220/26; C08F 220/18
[52] U.S. Cl. ............ 526/271; 526/320; 526/328.5; 525/327.4; 525/327.6; 525/310; 525/340; 525/379
[58] Field of Search ............ 526/271, 320, 526/328.5

[56] References Cited

U.S. PATENT DOCUMENTS

| | | | |
|---|---|---|---|
| 3,557,067 | 1/1971 | Burns et al. | 260/78.5 |
| 3,784,396 | 1/1974 | Fourment et al. | 117/21 |
| 3,976,717 | 8/1976 | Labana et al. | 260/836 |
| 4,211,691 | 7/1980 | FitzGerald et al. | 260/42.21 |
| 4,388,451 | 6/1983 | Culbertson et al. | 526/271 |
| 4,562,117 | 12/1985 | Kikukawa et al. | 428/407 |
| 4,605,597 | 8/1986 | Ogawa et al. | 428/522 |
| 4,694,037 | 9/1987 | Ofstead et al. | 524/557 |
| 4,861,841 | 8/1989 | Marrion | 525/327 |

FOREIGN PATENT DOCUMENTS

393446  10/1990  European Pat. Off. .

OTHER PUBLICATIONS

Derwent Abstract No. 88-123,693, Mar. 28, 1988.

Primary Examiner—Joseph L. Schofer
Assistant Examiner—Wu C. Cheng
Attorney, Agent, or Firm—Joseph C. Gil; Thomas W. Roy

[57] ABSTRACT

The present invention relates to powder coating compositions wherein the binder contains copolymers which are solid below 30° C., prepared from olefinically unsaturated compounds and have a weight-average molecular weight ($M_w$) of 1500 to 75,000, a content of free hydroxyl groups of 0.2 to 6.0% by weight and a content of intramolecular carboxylic acid anhydride groups (calculated as $C_4H_2O_3$) of 1 to 30% by weight.

8 Claims, No Drawings

POWDER COATING COMPOSITIONS CONTAINING COPOLYMERS HAVING HYDROXYL AND CARBOXYLIC ACID ANHYDRIDE GROUPS AS BINDERS

This application is a continuation of application Ser. No. 08/706,365 filed Aug. 30, 1996 now abn which is a Continuation of Ser. No. 08/727,766 filed Jul. 10, 1991 now abn.

BACKGROUND OF THE INVENTION

1. Field of the Invention

The present invention relates to powder coating compositions wherein the binders are based on self-crosslinking copolymers which are prepared from olefinically unsaturated compounds, are solid below 30° C. and have a defined content of both hydroxyl groups and intramolecular carboxylic acid anhydride groups.

2. Description of the Prior Art

The use of mixtures of organic compounds having at least two intramolecular carboxylic acid anhydride groups per molecule, especially copolymers based on succinic anhydride, and polyhydroxy compounds, optionally in admixture with catalysts, as binders for powder coatings is already known.

DE-OS 2,214,450 describes coating compositions containing A) ethylene - maleic anhydride copolymers in powder form and B) polyols containing at least one amino or amide group as crosslinkers. Besides the ethylene - maleic anhydride copolymers, ternary copolymers which also contain small quantities (<10%) of another olefin monomer or a vinyl or acrylic monomer can also be used. There is no disclosure of copolymers which contain hydroxyl groups in addition to anhydride groups.

EP-A 0,209,377 describes powder coating compositions, containing A) a component having carboxylic acid or carboxylic acid anhydride groups, preferably a polymer with at least two cyclic carboxylic acid anhydride groups per molecule and B) a component which contains two hydroxyl groups per molecule and at least one amino group for catalyzing the reaction between anhydride and hydroxyl groups. Again, there is no disclosure of copolymers which contain hydroxyl groups in addition to anhydride groups.

It has now surprisingly been found that copolymers prepared from olefinically unsaturated compounds which contain both chemically incorporated hydroxyl groups and also chemically incorporated intramolecular carboxylic acid anhydride groups in the same molecule are excellent binders for powder coatings, provided they satisfy the requirements concerning the softening point or range. The advantage of using such copolymers as binders for powder coatings compared with using the previously described mixtures according to the prior art is obvious, i.e., incompatibilities between individual binder components, which are often responsible for poor flow, inadequate body and inadequately low gloss values, cannot occur.

SUMMARY OF THE INVENTION

The present invention relates to powder coating compositions wherein the binder contains copolymers which are solid below 30° C., prepared from olefinically unsaturated compounds and have a weight-average molecular weight ($M_w$) of 1500 to 75,000, a content of free hydroxyl groups of 0.2 to 6.0% by weight and a content of intramolecular carboxylic acid anhydride groups (calculated as $C_4H_2O_3$) of 1 to 30% by weight.

DETAILED DESCRIPTION OF THE INVENTION

Even though German Offenlegungsschrift 3,912,828 is directed to copolymers containing both free hydroxyl groups and intramolecular carboxylic anhydride groups in chemically incorporated form, the copolymers are used exclusively as binders for solvent-containing coatings. This publication does not disclose the use of such copolymers or similar copolymers as binders for powder coatings.

The copolymers to be used according to the invention have a weight average molecular weight ($M_w$, styrene calibration), determined by the gel permeation chromatography method, of 1500 to 75,000, preferably 2000 to 60,000 and more preferably 3000 to 40,000. The copolymers contain both chemically incorporated free hydroxyl groups at a concentration of 0.2 to 6.0% by weight, preferably 0.4 to 4% by weight, and chemically incorporated intramolecular cyclic carboxylic acid anhydride groups corresponding to the formulas

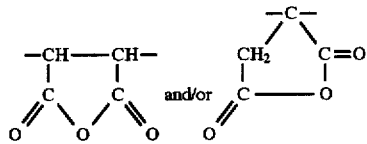

at a concentration of 1 to 30% by weight, preferably 2 to 25% by weight. The copolymers preferably contain 0.2 to 8, preferably 0.4 to 4, and more preferably 0.8 to 2 hydroxyl groups per acid anhydride group.

For the production of these copolymers, three groups of olefinically unsaturated monomers are used a) olefinically unsaturated monomers containing hydroxyl groups, b) olefinically unsaturated monomers containing intramolecular carboxylic acid anhydride groups and c) non-functional olefinically unsaturated monomers which are free from hydroxyl and carboxylic acid anhydride groups.

Monomers a) are in used in an amount of 1 to 50, preferably 2 to 40 parts by weight; monomers b) are used in an amount of 1 to 30, preferably 2 to 25 parts by weight; and monomers c) are used in an amount of 20 to 98, preferably 35 to 96 parts by weight, wherein all of these amounts are based on the total weight of monomers a), b) and c). It must also be taken into account that the proportions of the individual monomers in the mixture to be fed to the polymerization are calculated such that the above-mentioned amounts of chemically incorporated hydroxyl and acid anhydride groups are present in the copolymers. The content of these groups in the copolymer corresponds to the content of the same groups in the monomer mixture.

The ability to produce copolymers having both chemically incorporated hydroxyl groups and carboxylic acid anhydride groups by radical polymerization in solution with subsequent recovery of the binders in powder form by complete removal of the solvent by distillative evaporation in special extruders or by spray drying was surprising and not predictable because acid anhydride groups are reactive with hydroxyl groups at elevated temperatures. Nevertheless, these copolymers can be produced in organic solvents by radical copolymerization and completely freed from solvent, optionally in vacuum.

The monomers a) are alcohols which have monoolefinic unsaturation and preferably have a molecular weight of 58 to 500 and aliphatically bonded hydroxyl groups. Suitable alcohols include hydroxyalkyl esters of acrylic and methacrylic acids [(meth)acrylic refers to both acrylic or methacrylic] such as hydroxyethyl (meth)acrylate, hydroxypropyl (meth)acrylate and 4-hydroxybutyl (meth)acrylate; hydroxyalkyl vinyl ethers such as hydroxyethyl vinyl ether and hydroxybutyl vinyl ether; allyl alcohol; hydroxy derivatives of (meth)acrylamide such as N-(3-hydroxy-2,2-dimethylpropyl)-(meth)acrylamide; reaction products of glycidyl (meth)acrylate with monocarboxylic acids; reaction products of (meth)acrylic acid with monoepoxide compounds; and reaction products of the previously mentioned OH-functional, olefinically unsaturated compounds with ε caprolactone or butyrolactone.

Examples of monomers b) include itaconic anhydride or maleic anhydride; maleic anhydride is preferred.

Monomers c) have a molecular weight of 86 to 400, are free from hydroxyl groups and acid anhydride groups and preferably have monoolefinic unsaturation. Examples of these monomers are known and include esters of (meth)acrylic acids such as methyl acrylate, ethyl acrylate, n-butyl acrylate, isobutyl acrylate, tert.-butyl acrylate, 2-ethylhexyl acrylate, cyclohexyl methacrylate, methyl methacrylate, n-butyl methacrylate, isobutyl methacrylate and 2-ethylhexyl methacrylate; vinyl aromatics such as styrene, vinyltoluene, α methylstyrene, α ethylstyrene, ring-substituted and also mixed-isomer diethylstyrenes, isopropylstyrenes, butylstyrenes, and methoxystyrenes; vinyl ethers such as ethyl vinyl ether, n-propyl vinyl ether, isopropyl vinyl ether, n-butyl vinyl ether, and isobutyl vinyl ether; and vinyl esters such as vinyl acetate, vinyl propionate and vinyl butyrate.

In carrying out the copolymerization, mixtures of each of the monomers a) to c) previously described can also be used, provided that this selection of monomers results in copolymers which are solid below 30° C., preferably below 40° C., and are liquids at temperatures above 150° C. These conditions mean that the copolymers have a softening point or range, as determined by differential thermal analysis (DTA), of about 30° to 150° C., preferably 40° to 120° C.

This essential condition according to the invention for the copolymers is met if during their production a suitable ratio of "softening" monomers to "hardening" monomers is used. "Softening" monomers are those which result in a lowering of the softening point of the copolymers, while "hardening" monomers are those which result in an increase in the softening point of the copolymers.

"Softening" monomers include alkyl esters of acrylic acid such as methyl acrylate, ethyl acrylate, butyl acrylate, isobutyl acrylate, 2-ethylhexyl acrylate, lauryl acrylate and ethyl diglycol acrylate; vinyl esters such as vinyl propionate; and vinyl ethers such as vinyl methyl ether, vinyl ethyl ether, vinyl propyl ether, vinyl isobutyl ether, vinyl octadecyl ether and vinyl cyclohexyl ether.

"Hardening" monomers include alkyl esters of methacrylic acid such as methyl methacrylate, ethyl methacrylate, isobutyl methacrylate, cyclohexyl methacrylate, 2-phenylethyl methacrylate, tetrahydrofurfuryl methacrylate, isopropyl methacrylate, tert-butyl methacrylate, neopentyl methacrylate, isobornyl methacrylate and benzyl methacrylate; vinyl aromatics such as styrene, vinyltoluene, α-methylstyrene, and α-ethylstyrene; and heterocyclic vinyl compounds such as vinylpyrrolidone, vinylcaprolactam and vinylcarbazole.

The copolymers can be produced by the copolymerization of monomers a), b) and c) according to known radical polymerization processes such as bulk or solution polymerization. The monomers are copolymerized at temperatures of 60° to 140° C., preferably 80° to 120° C., in presence of radical sources and optionally molecular weight regulators.

The copolymers are preferably produced in inert solvents. Suitable solvents include aromatic solvents such as benzene, toluene, and xylene; esters such as ethyl acetate, butyl acetate, hexyl acetate, heptyl acetate, methylglycol acetate, ethylglycol acetate and methoxypropyl acetate; ethers such as tetrahydrofuran, dioxane, and diethyleneglycol dimethyl ether; ketones such as acetone, methyl ethyl ketone, methyl isobutyl ketone, methyl n-amyl ketone, and methyl isoamyl ketone; and mixtures of such solvents.

The copolymers can be prepared continuously or in a batch process. Usually, the monomer mixture and the initiator are metered steadily and continuously into a polymerization reactor and simultaneously the corresponding amount of polymer is continuously drawn off. Copolymers which are substantially chemically uniform can preferably be produced in this way. Copolymers which are substantially chemically uniform can also be produced by running the reaction mixture at constant speed into an agitated vessel without drawing off the polymer.

A portion of the monomers may also be charged in the previously described solvents and the remaining monomers and the auxiliary agents may be introduced into this receiver separately or together at the reaction temperature.

The polymerization may be carried out under atmospheric pressure or at pressures of up to 20 bar; preferably the polymerization is carried out under atmospheric pressure.

The initiators are used at concentrations of 0.05 to 15% by weight, based on the total weight of the monomers. Suitable radical initiators include aliphatic azo compounds such as azodiisobutyronitrile, azo-bis-(2-methylvaleronitrile), 1,1'-azo-bis-(1-cyclohexanenitrile) and 2,2'-azo-bis-(isobutyric acid) alkyl esters; symmetrical diacylperoxides such as acetyl, propionyl or butyryl peroxide, benzoyl peroxides substituted with bromo, nitro, methyl or methoxy groups and lauryl peroxides; symmetrical peroxydicarbonates such as diethyl, diisopropyl, dicyclohexyl, and dibenzoyl peroxydicarbonate; tert-butylperoxy-2-ethyl-hexanoate or tert-butyl perbenzoate; hydroperoxides such as tert-butyl hydroperoxide and cumol hydroperoxide; and dialkylperoxides such as dicumyl peroxide; tert-butyl cumyl peroxide and di-tert-butyl peroxide.

For regulating the molecular weight of the copolymers, known regulators can be used during preparation such as tert-dodecyl mercaptan, n-dodecyl mercaptan or diisopropyl-xanthogen disulfide. The regulators may be added in amounts of 0.1 to 10% by weight, based on the total weight of the monomers.

The solutions of the copolymers obtained from the copolymerization can then be fed without further processing to the evaporation or degassing process, in which the solvent is removed and the copolymers to be used according to the invention are recovered.

The copolymers produced in this way and to be used according to the invention are polyacrylate solid resins having the molecular weight and hydroxyl and acid anhydride group contents previously mentioned. At room temperature, or at slightly elevated temperatures which are still below their softening point, the resins are solid, stable in storage and suitable for the production of powder coating binders. This means that at temperatures of above 150° C., preferably of above 120° C., the copolymers to be used according to the invention flow to form perfect coating films and at temperatures of 150° to 220° C., preferably 150° to 200° C., can be cured to form high quality crosslinked films. Therefore, the copolymers according to the invention can be used as powder coating binders without the addition of further components.

It is possible in accordance with the present invention to add catalysts which accelerate the crosslinking reaction between hydroxyl and carboxylic acid anhydride groups and, thus, reduce the stoving time and/or the stoving temperature.

Examples of these catalysts include compounds with tertiary amine groups such as 1-(N,N-dimethylamino)-3-formylpropane, N,N-dimethylbenzylamine, 1,4-diazabicyclo-[2.2.2]-octane, 1,8-diazabicyclo-[5.4.0]-undec-7-ene, 1,5-diazabicyclo-[4.3.0]-non-5-ene, 1,2-dimorpholinoethane and 1,3,4-tricyclohexylhexahydro-1,3,5-triazine; salts based on compounds containing tertiary amine and quaternary ammonium groups such as (2-hydroxyethyl)-trimethylammonium chloride, triethylamine hydrochloride, tetrabutylammonium chloride, tetraethylammonium bromide, tetrahexylammonium chloride and tetramethylammonium chloride; organic tin compounds such as tin dioctoate, dibutyltin dilaurate, dibutyltin diacetate and dibutyltin dichloride; and organic phosphorus compounds such as triphenylphosphine.

The tin and phosphorus compounds as well as the tertiary amines are the preferred catalysts. The catalysts, if used at all, are used in amounts of up to 0.1% by weight, preferably up to 0.05% by weight, based on the weight of the copolymers.

For the production of the ready-to-use powder coating compositions, the solvent-free copolymers according to the invention are optionally blended with pigments such as titanium dioxide, flow agents such as silicon compounds and catalysts such as those of those previously described. These materials are homogenized in the melt, e.g., in extruders or kneaders, preferably at temperatures of 100° to 120° C. The solidified solid is ground and freed from larger particles, e.g., above 0.1 mm, by screening. The powder coating compositions can be applied by known powder application processes, such as electrostatic powder spraying or fluidized bed coating, to the heat-resistant substrates to be coated. The coatings can be cured by heating at temperatures of 150° to 220° C., preferably 150° to 200° C. The resulting coatings are hard, lustrous, solvent-resistant coatings having excellent corrosion inhibiting properties and a good deflection temperature under load. According to the invention, any heat-resistant substrates, such as metal or glass substrates, can be coated.

In the following examples all parts and percentages are by weight unless otherwise indicated.

EXAMPLES

I. Preparation Procedures for the Hydroxyl- and Anhydride-group Containing Copolymers $A_1$ to $A_8$ Part I was charged to a 25 l stainless steel pressure reactor equipped with agitating, cooling and heating devices and heated to the reaction temperature. Part II and part III were then charged simultaneously. Part II was added over a total period of 3 hours and part III was added over a total period of 3.5 hours. The mixture was stirred for an additional 1 hour in a further agitation phase at the temperature indicated in Table I.

The polymer solutions obtained were completely freed from solvent in a commercial evaporator-extruder at a temperature of about 150° C., a residence time of about 2 minutes and a vacuum of about 200 Torr, and were then cooled and granulated.

The reaction temperatures and the composition of parts I to III are listed in Table I together with the properties of the copolymers obtained.

TABLE I (amounts in g)

| | Copolymer | | | | | | | |
|---|---|---|---|---|---|---|---|---|
| | $A_1$ | $A_2$ | $A_3$ | $A_4$ | $A_5$ | $A_6$ | $A_7$ | $A_8$ |
| Part I | | | | | | | | |
| Toluene | 8000 | 8000 | 8000 | 8000 | 8000 | 8000 | 8000 | 8000 |
| Part II | | | | | | | | |
| Methyl methacrylate | 4290 | 3718 | 4592 | 3118 | 3118 | 2974 | 3440 | 3764 |
| Butyl methacrylate | 2688 | — | 3024 | 3764 | — | 2150 | 3440 | 3118 |
| 2-ethylhexyl methacrylate | — | 3136 | — | — | — | — | — | — |
| Butyl acrylate | — | — | — | — | 3764 | 1613 | — | — |
| Styrene | 1742 | 1680 | 1344 | 1612 | 1612 | 1613 | 1614 | 1612 |
| Hydroxyethyl methacrylate | 1162 | 1266 | 1064 | 1290 | 1290 | — | 1290 | 1290 |
| Hydroxypropyl methacrylate | — | — | — | — | — | 1434 | — | — |
| Maleic anhydride | 870 | 952 | 728 | 968 | 968 | 968 | 968 | 968 |
| Part III | | | | | | | | |
| tert-butylperoxy-2-ethyl-hexanoate (70%) | 640 | 640 | 640 | 640 | 640 | 640 | 640 | 640 |
| Toluene | 608 | 608 | 608 | 608 | 608 | 608 | 608 | 608 |
| Polymerization temperature (°C.) | 110 | 110 | 110 | 110 | 110 | 110 | 110 | 110 |
| Temperature of the further agitation phase (°C.) | 90 | 90 | 90 | 90 | 90 | 90 | 90 | 90 |
| Solids content (%) | 55.2 | 55.4 | 55.5 | 55.1 | 55.6 | 55.0 | 55.5 | 55.0 |
| Viscosity (23° C., mPa · s) | 15670 | 18490 | 21340 | 12883 | 3766 | 3849 | 13897 | 16023 |
| Softening point of the solid resin (DTA, °C.) | 71.6 | 60.4 | 53.5 | 59.4 | 40.8 | 56.5 | 60.9 | 62.2 |

II. Production of the Powder Coating Composition According to the Invention 60 parts of copolymer $A_1$ to $A_8$ were mixed in each case with 40 parts of a titanium dioxide pigment and, if applicable, the catalysts mentioned in Table II. The mixtures were melted in an extruder at about 120° C. and homogenized. After solidification of the melt the product was ground at 20° C., freed by screening from components having a particle size above 90 μm, applied with an electrostatic spraying device to test sheets and cured for 15 minutes at 180° C.

The solvent resistance was tested by a rubbing test with a wad of cotton wool which had been dipped in acetone. The number of double rubs which were made before there was a visible change in the coating film is provided. No more than 50 double strokes were carried out per film (for details, see Table II).

TABLE II

Formulations of the powder coating agents according to the invention, data in % by weight.

| | Application Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Copolymer | 59.4 $A_1$ | 58.8 $A_1$ | 60.0 $A_1$ | 60.0 $A_2$ | 60.0 $A_3$ | 59.7 $A_4$ | 60.0 $A_5$ | 59.7 $A_6$ | 59.9 $A_6$ | 59.9 $A_7$ | 59.9 $A_7$ | 59.9 $A_8$ |
| Dimorpholino-ethane | 0.6 | 1.2 | | | | | | | | | | |
| Ti dioctanoate | | | | | | 0.3 | | | | | | |
| 1-(N,N-dimethylamino)-3-formylpropane | | | | | | | | | | | 0.1 | 0.1 |
| Triethylamine | | | | | | | | | 0.1 | | | |
| Triphenylphosphine | | | | | | | | 0.3 | | | | |
| Benzyl-N-dimethylamine | | | | | | | | | | 0.1 | | |
| Titanium dioxide | 40.0 | 40.0 | 40.0 | 40.0 | 40.0 | 40.0 | 40.0 | 40.0 | 40.0 | 40.0 | 40.0 | 40.0 |
| Acetone rubbing test (number of double strokes) | 50 | 50 | 30 | 50 | 25 | 48 | 44 | 46 | 50 | 50 | 50 | 50 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a coating which comprises
   a) applying to a heat-resistant substrate a binder-containing powder coating composition wherein the binder consists essentially of one or more copolymers which
      i) contain hydroxyl and anhydride groups as the only reactive groups,
      ii) are solid below 30° C.,
      iii) have a softening range of 30° to 150° C.,
      iv) are prepared from olefinically unsaturated compounds and
      v) have a weight average molecular weight ($M_w$) of 1500 to 75,000, a content of free hydroxyl groups of 0.2 to 6.0% by weight and a content of intramolecular carboxylic acid anhydride groups (calculated as $C_4H_2O_3$) of 1 to 30% by weight and
   b) curing the coating at a temperature of 150° to 220° C.

2. The process of claim 1 which additionally contains a catalyst for the reaction between anhydride and hydroxyl groups.

3. The process of claim 2 wherein said catalyst comprises a tertiary amine compound.

4. The process of claim 2 wherein said catalyst comprises an organic tin compound or an organic phosphorus compound.

5. A process for preparing a coating which comprises
   a) applying to a heat-resistant substrate a binder-containing powder coating composition wherein the binder consists of one or more copolymers which
      i) contain hydroxyl and anhydride groups as the only reactive groups,
      ii) are solid below 30° C.,
      iii) have a softening range of 30° to 150° C.,
      iv) are prepared from olefinically unsaturated compounds and
      v) have a weight average molecular weight ($M_w$) of 1500 to 75,000, a content of free hydroxyl groups of 0.2 to 6.0% by weight and a content of intramolecular carboxylic acid anhydride groups (calculated as $C_4H_2O_3$) of 1 to 30% by weight and
   b) curing the coating at a temperature of 150° to 220° C.

6. The process of claim 5 which additionally contains a catalyst for the reaction between anhydride and hydroxyl groups.

7. The process of claim 6 wherein said catalyst comprises a tertiary amine compound.

8. The process of claim 6 wherein said catalyst comprises an organic tin compound or an organic phosphorus compound.

* * * * *